March 31, 1931.  I. K. RYSTEDT  1,799,124
TIRE CORE
Filed March 15, 1928
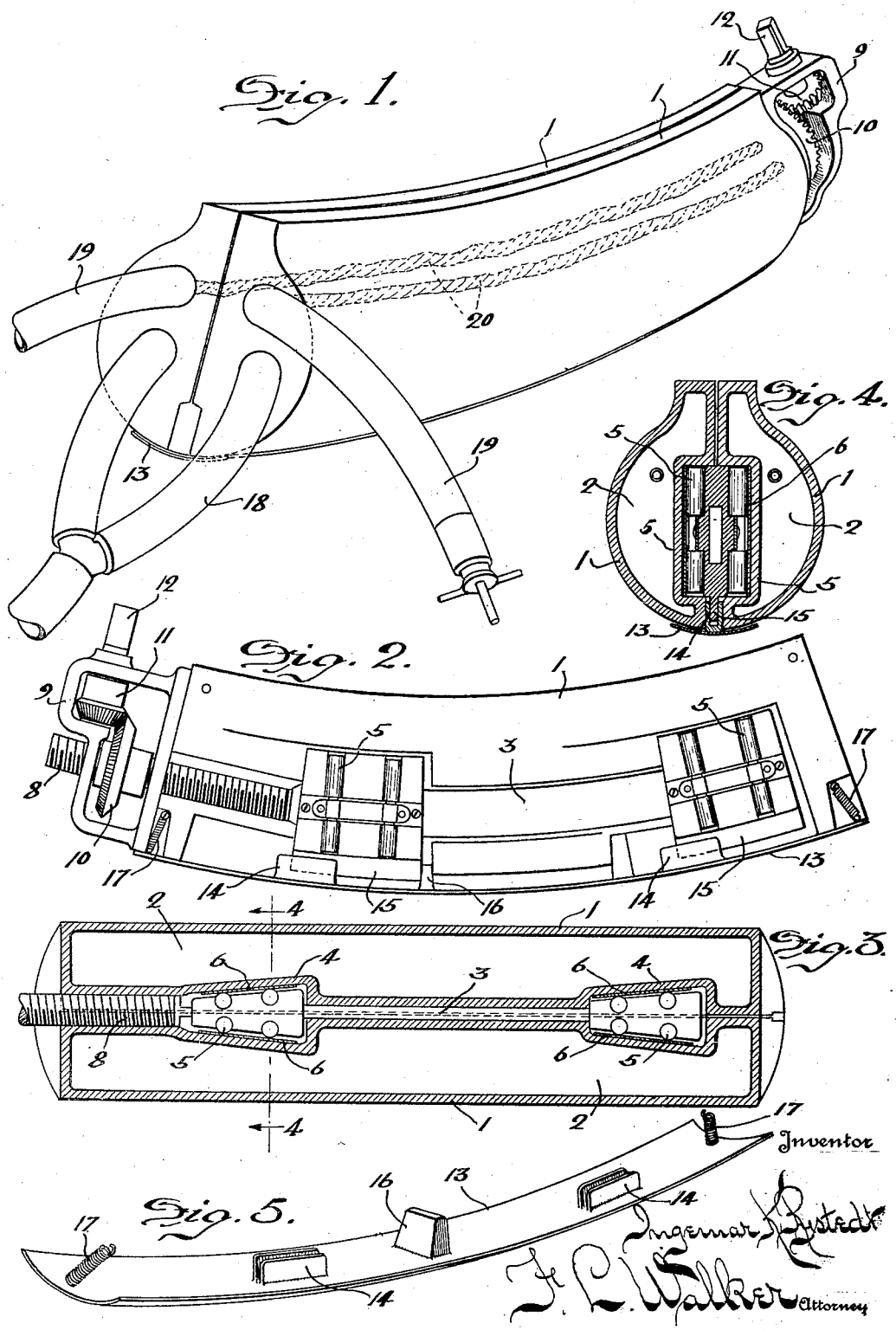

Patented Mar. 31, 1931

1,799,124

UNITED STATES PATENT OFFICE

INGEMAR K. RYSTEDT, OF DAYTON, OHIO, ASSIGNOR TO THE NATIONAL TIRECORE COMPANY, OF DAYTON, OHIO, A CORPORATION OF OHIO

TIRE CORE

Application filed March 15, 1928. Serial No. 261,954.

My invention relates to tire cores for repair of pneumatic tire casings or shoes and, more particularly to an expansible heated core.

Tire cores or expansible mandrels having separable hollow sections with means for relatively adjusting such parts have been more or less generally known but have presented difficulties of assembly in commercial use which are sought to be overcome in the present development. The present construction includes two relatively adjustable tire sections between which is located a reciprocatory screw operated bar having rollers engaging with inclined cam faces upon the adjacent walls of the separable side sections, by the adjustment of which the sections are forced apart. A tread strip covers the division space between the adjustable side sections when separated and has interlocking engagement with the intermediate adjusting bar by which the tread strip is maintained in its normal intermediate position, and it is further interengaged with the side sections of the core to prevent longitudinal displacement. To minimize weight and also for its superior heat conductive and radiation qualities the core sections are preferably made from aluminum, which however, is too soft to withstand the pressure and wear of the adjusting rollers over a long period of time. Consequently the inclined cam faces of such aluminum side sections are overlaid with hardened steel plates upon which the adjusting rollers bear. The roller carrying bar has a screw threaded stem upon which is threaded a beveled gear meshing with a corresponding beveled pinion provided with a polygonal stem disposed conveniently for engagement with a wrench.

The object of the invention is to simplify the structure, as well as the means and mode of operation of adjustable tire cores whereby they will not only be cheapened in construction, but will be more efficient, positive in operation, uniform in action, and unlikely to get out of repair.

A further object of the invention is to provide improved means for relatively adjusting the separable sections of such a core, whereby the separation may be uniformly and easily effected.

A further object of the invention is to provide an improved form of tread strip for such core, and means for maintaining the strip in a normal medial position relative to the adjustable core sections.

A further object of the invention is to provide an improved form of conduit for withdrawing the spent heating medium from the hollow core sections.

With the above primary and other incidental objects in view, as will more fully appear in the specification, the invention consists of the features of construction, the parts and combinations thereof, and the mode of operation, or their equivalents, as hereinafter described and set forth in the claims.

Referring to the accompanying drawings, wherein is shown the preferred, but obviously not necessarily, the only form of embodiment of the invention, Fig. 1 is a perspective view of the assembled tire core forming the subject matter hereof. Fig. 2 is a side elevation of one section of the core and the adjusting means therefor, from which the opposite side core section has been removed. Fig. 3 is a longitudinal sectional view of the assembled form. Fig. 4 is a transverse sectional view on line 4—4 of Fig 3. Fig. 5 is a detail perspective view of the tread strip removed from the core.

Like parts are indicated by similar characters of reference throughout the several views.

Referring to the accompanying drawings 1—1 are the side sections of the expansible core, which are exteriorly contoured to substantially agree with the interior shape of a standard or conventional pneumatic tire shoe or casing. These sections 1—1 are preferably cast from aluminum and are hollow to afford interior steam chambers 2 for the circulation of steam or other heating medium. The inner or adjacent faces of the core sections 1—1 are recessed or indented to accommodate a longitudinally adjustable operating bar 3. This bar 3 carries at spaced intervals the heads 4. Mounted in suitable recesses in the heads 4 with their peripheries projecting slightly beyond the lateral faces of such heads are a number of rollers 5. These rollers 5 bear upon hardened steel reinforcement plates 6 forming the bottom or walls of registering inclined pockets or recesses 6 formed in the adjacent faces of the hollow adjustable side sections 1—1. The heads 4 may be formed integral with the operating bar 3, but are preferably pivotally connected thereto for convenience of manufacture and for ease of operation, thereby affording a slight relative adjustment of the parts to accommodate their movement in an arcuate path. Extending from one end of this assembly of operating bar 3 and heads 4 is a screw threaded stem 8 extending beyond the end of the adjustable side sections 1—1. Located at one end of the side sections 1—1 and engaging therewith in such manner as to permit the relative adjustment of said sections is a frame member 9 through which the screw threaded stem 8 extends and in which is mounted upon such threaded stem a beveled gear 10. This beveled gear 10 is provided with a hub threaded upon the stem 8 in lieu of a nut. The gear 10 meshes with a beveled pinion 11 also mounted in the frame member 9 and secured upon a revoluble stem or shaft having a polygonal head 12 for engagement of a wrench. By rotating the polygonal stem or shaft 12 the beveled gear 9 is rotated upon the threaded stem 8 to draw the heads 4 and operating bars 3 longitudinally intermediate the sections 1—1. Camming action of the rollers 5 upon the hardened steel interior faces of the cam shaped recesses serves to force the sections 1—1 apart, thereby spreading the core and exerting interior pressure upon the enclosing tire casing or shoe. Located upon the convex or tread side of the core is a tread strip 13 of concavo-convex form agreeing with the contour of the core sections 1—1. This strip 13 is provided at spaced intervals upon its inner or core side with slotted lugs which straddle with sliding engagement dependent flanges 15 upon the adjusting heads 4. A transverse lug 16 secured to the tread strip 13 engages in registering notches transversely disposed in the side sections 1—1 and prevents longitudinal displacement of the strip 13, while the slotted lugs 14 by their engagement with the dependent flange 15 of the adjusting head serves to hold the strip in its intermediate or normal position, in which it covers the division space between the sections 1—1 when separated. Due to the arcuate contact surfaces of the sections 1—1 and the strip 13 the latter is subjected to a somewhat camming action as the sections 1 are separated, which is compensated for by springs 17 connecting the ends of the strip 13 with one of the adjustable side sections 1. These springs 17 tend to hold the strip in close contact with the adjustable side sections, retracting the strip as the sections approach each other and compensating for the camming action of such sections as they are separated.

Leading to the interior chambers 2 of the sections 1 is an inlet conduit 18 for the supply of steam or other heating medium therethrough. This conduit 18 is bifurcated or branched and communicates with both sections. Leading from each of these sections is an outlet or exhaust conduit 19. To insure the circulation of the heating medium within the chambers 2 the exhaust or outlet conduits 19 are provided with flexible extensions 20 extending within the chamber 2 to approximately the opposite end of the chamber or section 1 as indicated by dotted lines in Fig. 1. If this extension or continuation 20 is flexible the conduit is more easily assembled in the section than when such extensions are substantially inflexible or rigid, as is ordinarily the case.

From the above description it will be apparent that there is thus provided a construction of the character described, possessing the particular features of advantage before enumerated as desirable, but which obviously is susceptible of modification in its form, proportions, and arrangement of parts, without departing from the principle involved or sacrificing any of its advantages.

While in order to comply with the statute the invention is described in language more or less specific as to structural features, it is to be understood that the invention is not limited to the specific details shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. An expansible tire core including a plurality of longitudinally divided relatively movable sections contoured to substantially agree with the interior of a tire casing, a longitudinally movable operator interposed between said sections, means for reciprocating the operator, a plurality of longitudinally inclined cam faces located at spaced intervals upon the adjacent faces of the sections, and actuating means for the operator mounted exteriorly of the relatively movable sections for adjusting the operator to effect the separation of said sections under pressure.

2. An expansible tire core including a plurality of longitudinally divided relatively movable sections substantially agreeing with the interior contour of a tire casing, a longitudinally movable operator bar interposed between the sections, a screw stem at one end of the bar, heads carried by the bar and movable in unison therewith and with each other, longitudinally inclined cam faces on the adjacent faces of the side sections engaged by the heads by the relative adjustment of which the sections are forced apart, an independent mounting frame abutting upon one end of said sections, in relation with which the sections are laterally movable, a threaded collar carried by said independent mounting frame and having engagement with the screw stem, the collar and stem being relatively adjustable to move the bar and thereby spread said sections.

3. An expansible tire core including a pair of longitudinally divided side sections substantially agreeing with the interior contour of a tire casing, a longitudinally movable operator bar interposed between the sections, a series of rollers carried by the bar, a plurality of longitudinally inclined cam faces upon the adjacent faces of the side sections engaged by said rollers, means for reciprocating the bar whereby the rollers will be moved in unison in the same direction upon the inclined cam surfaces to effect the separation of said sections.

4. An expansible tire core including a pair of longitudinally separated side sections substantially agreeing with the interior contour of a tire casing, inclined cam surfaces formed in the adjacent faces of the sections, reinforcement plates overlying the inclined surfaces, rollers interposed between the sections and engaging the inclined reinforcement plates and means for simultaneously moving the rollers upon said plates to effect the separation of the sections.

5. An expansible tire core including a pair of longitudinally divided side sections, a reciprocatory operator interposed therebetween, a tread strip overlapping the line of separation between said sections, a slotted lug upon the tread strip, a flange upon the reciprocatory operator engaging in the slot of the lug to maintain the tread strip medially relative to the side sections in all positions of adjustment of the latter.

6. An expansible tire core including relatively adjustable side sections, operator means interposed therebetween, a tread strip overlying the division line between said side sections, springs tending to hold the strip in contact with the side sections and compensate for the relative adjustment thereof, and a lug upon the inner side of the strip engaging in a recess in one of the sections to prevent longitudinal displacement of the strip.

7. An expansible tire core including relatively adjustable side sections, operator means interposed therebetween, a tread strip overlying the division line between said side sections, springs tending to hold the strip in contact with the side sections and compensate for the relative adjustment thereof, and means for preventing longitudinal and lateral displacement of the strip relative to the side sections.

In testimony whereof, I have hereunto set my hand this 6th day of March, A. D. 1928.

INGEMAR K. RYSTEDT.